United States Patent Office 3,809,751
Patented May 7, 1974

3,809,751
ANTIBIOTIC-STABLE LIQUID PROTEIN SUPPLEMENTS CONTAINING NON-PROTEIN NITROGEN, PHOSPHORUS AND A TETRACYCLINE ANTIBIOTIC
Anthony Abbey, Milltown, N.J., assignor to American Cyanamid Company, Stamford, Conn.
No Drawing. Continuation-in-part of abandoned application Ser. No. 802,195, Feb. 25, 1969. This application Sept. 24, 1970, Ser. No. 75,242
Int. Cl. A61k 21/00
U.S. Cl. 424—227  6 Claims

ABSTRACT OF THE DISCLOSURE

This invention relates to novel antibiotic-stable liquid protein supplements containing a source of nonprotein nitrogen, phosphorus, an antibiotic selected from the group consisting of tetracycline antibiotics and bacitracin and from about 1% to 8% by weight of a physiologically acceptable salt of a divalent or trivalent metal which forms an insoluble or unionizable salt or complex with phosphorus and which metal is selected from the group consisting of nutritionally essential metals and aluminum, said supplement having a pH between about 7.0 and 9.0. This invention also relates to a method for the preparation of the above-mentioned antibiotic-stable liquid protein supplements.

---

This application is a continuation-in-part of my copending application Ser. No. 802,195, filed Feb. 25, 1969, now abandoned.

For more than a decade liquid protein supplements have been employed by the livestock industry as addendums to solid feedstuffs. These supplements vary widely in formulation but are recognized throughout the industry as those liquid feed formulations which contain nonprotein nitrogen and combined phosphorus. Generally the nonprotein nitrogen is provided in the form of urea, ammonia or diammonium phosphate. It amounts to about 3% to 25% by weight of the supplement and furnishes about 10% to 60% protein equivalent. Phosphorus is usually furnished as phosphoric acid, diammonium phosphate, ammonium polyphosphate or mono sodium phosphate in sufficient amount to provide about 0.05% to 3.5% of phosphorus by weight of supplement.

While these supplements vary widely in formulation due to the fact that they are generally tailored to the requirements of particular livestock species receiving the supplement, the region or environment in which the animal is raised, or to the specification of individual livestock managers, they nevertheless, usually contain, in addition to nonprotein nitrogen and phosphorus, several more or less basic ingredients including molasses, trace minerals, salt and vitamins. However, even in these basic ingredients, there may be variation as is evident by the fact that cane, beet, wood, corn and citrus molasses each distinguishable from the others, are used interchangeably as the molasses source. Also a variety of vitamins, including A, D, E, $B_2$, niacin, choline and the like, in various combinations and at different levels, are used. These supplements may also contain fish solubles, distiller solubles, fermentation solubles, fats, oils, alcohol, glycerine, fermentation liquors and water.

Heretofore, in an effort to further improve upon the liquid protein supplements, several drugs including, neomycin, oleandomycin, diethylstilbestrol, bacitracin and the tetracyclines such as chlortetracycline, tetracycline and oxytetracycline were also added. Unfortunately, however, these efforts were not wholly satisfactory especially with regard to the use of tetracyclines and bacitracin. The major difficulty encountered in the admixture of the latter drugs with these liquid protein supplements was the very substantial loss of drug potency. With tetracyclines, e.g., chlortetracycline, it has been found that as much as 30% to 70% of the antibiotic is lost in supplements stored at room temperature, i.e. 72° F., for seven days. At 100° F. this loss is even more pronounced.

Since in practice, supplements are generally prepared in bulk, transported to feedlots, pens or locations where they are used and then offered in relatively small quantities, i.e. about 0.5 to 4.0 pounds, and generally 1.0 to 2.0 pounds, per animal per day, usually about two to four weeks transpire before the prepared supplement is exhausted. Obviously then, during this period there is a substantial loss of antibiotic potency and the efficacy of the product, especially in the later days of use, is grossly diminished. Thus it is apparent that if an antibiotic-stable liquid protein supplement could be prepared, such supplement would be exceedingly useful and most desirable.

It is therefore an object of the present invention to provide an antibiotic-stable liquid protein supplement.

It is also an object of the present invention to provide a method for preparing liquid protein supplements containing a source of nonprotein nitrogen, a source of phosphorus and an antibiotic such as chlortetracycline, tetracycline, demethylchlortetracycline, oxytetracycline and bacitracin, which is stabilized against antibiotic loss.

It is a further object of the present invention to provide a method of preparing liquid protein supplements containing up to about 43% of nonprotein nitrogen, a source of phosphorus and an antibiotic such as a tetracycline or bacitracin, which is stabilized against antibiotic loss. This latter objective is achieved by the surprising discovery that when wood molasses, or hemicellulose extract as it is also known, is used in the preparation of liquid protein supplements, a substantially greater amount of nonprotein nitrogen, for example urea or biuret, can be dissolved in the molasses; approximately 18% more.

In accordance with the present invention stable antibiotic liquid protein supplements containing from about 3% to 43% by weight of nonprotein nitrogen, from about 0.05% to 3.5% and preferably 0.75% to 2.0% by weight of phosphorus; from about 0.01% to 7% by weight of an antibiotic selected from the group consisting of tetracycline antibiotics including chlortetracycline, tetracycline, oxytetracycline and demethylchlortetracycline, bacitracin and mixtures thereof, are prepared by admixing with said supplements from about 1% to 8% and preferably 4% to 8% by weight of a physiologically acceptable salt of a divalent or trivalent metal which forms an insoluble or non-ionizable salt or complex with the phosphate and other detrimental factors present in the supplement, said metal being selected from the group consisting of nutritionally essential metals and aluminum, and adjusting the pH of said supplement to a value between about 7.0 and 9.0 and preferably between 8.0 and 9.0.

In practice we have found that the salts of the essential metals calcium, magnesium, iron, copper, cobalt, zinc and manganese and the nonessential metal aluminum are most efficacious as stabilizing agents for the antibiotics in liquid supplements. Moreover, we have found that calcium salts are superior stabilizing agents in such compositions and most preferred because they effectively stabilize the tetracycline type antibiotics as well as bacitracin; because calcium is a required feed nutrient; and finally because calcium salts are low in cost and readily available commercially.

It has also been found that the highly water soluble salts of the above-named metals are usually easier to use and more effective as antibiotic stabilizing agents in the above referred to systems, than are the poorly soluble salts. However, it is noted that salts or oxides, which are generally poorly soluble in water but soluble under acidic conditions, can be employed satisfactorily in the preparation of the supplements of the present invention. This is believed to be primarily due to the fact that liquid protein supplements are usually acidic. As such, the reaction of the metal salt with the acid frees the metal cation permitting it to tie up the phosphate anion which is apparenly a primary source of antibiotic degradation in conventional liquid protein supplements. Among the salts which are effective in the present invention are the chlorides, hydroxides, carbonates, sulfates, acetates, gluconate, and citrates of the above-named metals.

While the percent by weight of divalent or trivalent metal salt generally required to obtain stabilization of antibiotics in phosphorus containing protein molasses supplements generally amounts to about 1% to 8% by weight of the supplement, optimum stability is generally obtained when the amount of divalent or trivalent metal salt added to the supplement is sufficient to provide one equivalent weight of metal cation for each equivalent weight of phosphorus present in the supplement.

In practice we have also found that the pH of the supplement is critical. If this value is below 7.0 the stability of the antibiotic in the supplement is markedly diminished whereas, if it is raised substantially above 9.0 the palatability of the supplement is adversely affected. We have also found that the stability of the antibiotic can be further improved by lowering the water content of the supplement and/or by increasing the particle size of the antibiotic used.

The novel supplements of the present invention have utility as animal feed supplements. They may be administered to livestock in any convenient manner as, for example, top dressing for solid feed, mixed with the feed or given free choice in a separate vessel or trough. These compositions have the advantage that they permit preparation of large quantities of supplement by reason of increased antibiotic stability under storage conditions. Moreover, their use results in reduced disease incidence in animals, improved weight gains, enhanced feed conversion and improved quality of meat and hides at lower costs to the livestock owner since loss of antibiotic which normally occurs on standing is markedly reduced and thus more antibiotic is available to the animal when it is finally consumed.

Other advantages may become apparent from the examples set forth below. These examples are provided simply as illustrations of the invention and are not intended as limitations thereof.

EXAMPLE 1

The marked improvement in chlorotetracycline stability in liquid "protein molasses supplements" hereinafter referred to as PMS, is demonstrated by the following tests wherein five, 50 ml. samples of a commercial PMS obtained from John Jirdon Co., comprising molasses, urea, phosphoric acid, trace minerals and sodium chloride and having a pH of 6.2, are admixed with calcium chlorotetracycline (CTC) complex in sufficient amount to provide 500 mcg. CTC/ml. of supplement. Test samples are then treated as described in the table below. Such treatments include admixture with 2% by weight of calcium chloride, with and without pH adjustment to 7.9–8.0 and/or buffering with potassium phosphate. Treatments are partitioned into 5, 10 ml. samples. The test tubes containing samples are then placed in boiling water for 10 or 30 minute periods after which samples are removed and assayed microbiologically for CTC. Data obtained are reported below.

TABLE 1

| Molasses treatment | Control, no heat, mcg. CTC/tube | Percent activity after immersion in boiling water | |
|---|---|---|---|
| | | 10 min. | 30 min |
| A. Molasses mixture 50 ml. plus 2% CaCl₂ plus 5N NaOH solution (2.3 ml.) pH 7.9–8.0; Ca CTC-10 mg./tube admixed with 10 ml. PMS. | 5,250 γ CTC≅100%→ | 94 | 44 |
| B. 50 ml. molasses mixture plus 2% CaCl₂ plus 15 g. K₂HPO₄ to pH 7.8–8.0; Ca CTC, 10 mg./tube admixed with 10 ml. PMS. | 5,050 γ CTC≅100% → | 55 | 26 |
| C. 50 ml. molasses mixture plus 2% CaCl₂=pH 5.5, no pH adjustment; Ca CTC, 10 mg./tube admixed with 10 ml. PMS. | 5,200 γ CTC≅100% → | 87 | 34 |
| D. 50 ml. plain molasses, pH 6.2, Ca CTC 10 mg./tube admixed with 10 ml. PMS | 5,200 γ CTC≅100% → | 39 | 20 |
| E. No PMS, aqueous K₂HPO₄, KH₂PO₄ buffer, pH 8.0, approximate 0.1 molar; Ca CTC 10 mg./10 ml. buffer solution tube. | 5,100 γ CTC≅100% → | 52 | 19 |

EXAMPLE 2

The enhancement of chlortetracycline stability in protein molasses supplements is demonstrated in the following test. A PMS supplement pH 6.0–6.1, 50–66% cane or beet molasses, 10.5–16.5% urea, 5–6% phosphoric acid, q.s. to 100% with H$_2$O, Vitamins A and D$_3$ and trace minerals is used in all treatments. For control PMS pH 6.0–6.1 as received was used. 10 ml. samples of PMS were placed in 20 cc. vials and 15 mg. chlortetracycline fermentation mash solids mixed therewith. Test treatments were prepared in similar manner except that PMS treated with 2% calcium chloride and adjusted to pH 6.0 with NaOH was in one treatment admixed with 15 mg. chlortetracycline fermentation mash solids and in another treatment adjusted to pH 8.0 and admixed with calcium chlortetracycline complex. These samples were assayed microbiologically for chlortetracycline and then stored at room temperature and again assayed one, two and five days after preparation. The data obtained are provided below.

TABLE II

Chlortetracycline (CTC) stability in "Liquid feed" molasses mixture percentage recovery of activity

| "Liquid feed" treatment series | Activity from— | Days stored at room temperature— | | | |
|---|---|---|---|---|---|
| | | 0 | 1 | 2 | 5 |
| Control, as received pH 6.0–6.1. | AFI [1] | 100 | 84 | 57 | 28 |
| Calcium chloride, 2% adjusted to obtain pH 6.0. | AFI [1] | 100 | 100 | 72 | 61 |
| Calcium chloride, 2% then adjusted to obtain pH 8.0. | Calcium [2] CTC | 100 | 100 | 92 | 87 |

[1] AFI=chlortetracycline fermentation insolubles; 15 mg./10 ml. molasses vial; 0 day initial assay average 1,620 mcg. CTC/vial.
[2] Ca CTC; 5 mg./15 ml. molasses vial; 0 day initial assay average 2,470 mcg. CTC/vial.

EXAMPLE 3

Following the procedure of Example 2 and employing the same protein molasses supplement employed therein except that said supplement was stored for several months and had a pH of 5.8, the following tests were run. 90 ml. samples of molasses supplement were treated with 2.2 grams dibasic calcium phosphate or 1.8 gms. of $CaCl_2$ and the pH of the mixture adjusted to 8.5 with 5 N NaOH. 4 ml. samples from each treatment were then admixed with 10 mg. of the fermentation mash solids and all preparations were assayed. Samples were selected from each group and subjected to heat treatment (i.e. 30 minutes in boiling water) and then assayed. Other samples were stored at room temperature and assayed microbiologically at intervals up to ten days. The results obtained are provided in Table III below.

TABLE III

| "Liquid feed" PMS treatment | AFI percent recovery [1] after— | | | |
|---|---|---|---|---|
| | 30 minutes boiling $H_2O$ | Days stored room temperature— | | |
| | | 4 | 7 | 10 |
| CONTROL PMS "as is" pH 5.8 | 14 | 57 | 38 | 31 |
| Molasses mixture, 90 ml. plus $CaHPO_4$ 2.2 g., 5N NaOH to pH 8.5; 10 mg. AFI admixed with 4 ml. molasses/tube | 28 | 52 | 25 | 14 |
| Molasses mixture, 90 ml. plus 2% (1.8 g.) $CaCl_2$ dissolved in 5 ml. $H_2O$; 5N NaOH to pH 8.5; 10 mg. AFI admixed with 4 ml. molasses/tube | 57 | 94 | 82 | 92 |

[1] For percent recovery used average initial microbioassay value of 10 mg. AFI tubes, i.e. 880 mcg. CTC/tube=100%.

TABLE IV

| Molasses mixture treatment | Test pH | Boiling water bath, 30 min., percent recovery CTC activity |
|---|---|---|
| Control: molasses mix 60 g. added, 5 N NaOH (0.5 ml.) to pH 7.0; to each tube containing 25 mg. antibiotic product added 15 g. molasses mix | 7.0 | 13.3 |
| Control: molasses mix, 60 g. added 5 N NaOH (1.5 ml.) to pH 8.1; as above, 25 mg. antibiotic product/15 g. molasses | 8.1 | 12.7 |
| 50 g. molasses plus 4 g. $MgCl_2·6H_2O$ plus 6 ml. $H_2O$ plus 1.7 ml. of 5 N NaOH to pH 7.0; added 15 g. adjusted mix to each tube with 25 mg. antibiotic product | 7.0 | 74.6 |
| 50 g. molasses plus 4 g. $MgCl_2·6H_2O$ plus 6 ml. $H_2O$ plus 2.2 ml. 5 N NaOH to pH 8.0; added 15 g. mixture to each tube with 25 mg. antibiotic product | 8.0 | 88.0 |

NOTE.—One tube of each mixture tested unheated, average of all four "no heat" tubes=2,192 mcg. CTC/tube≅100% recovery. Used FDA cylinder plate microbioassay, AOAC methods as in all previous tests.

EXAMPLE 5

Stabilization of protein-molasses supplements (PMS) against loss of antibiotic potency over extended periods of time is hereinafter demonstrated. In the following tests a protein molasses supplement (50% protein, 1% phosphorus, 10% salt, q.s. molasses and having a pH 6.8) is employed as such or treated with 2% $CaCl_2$ and adjusted to pH 8.5 with 5 N NaOH. 25 mg. portions of a chlortetracycline fermentation product (110 mcg./mg.) are then placed in small vials and mixed with either 10 gms. or 20 gms. of PMS. In these tests "B" indicates use of untreated PMS, "C" indicates PMS treated with $CaCl_2$ and pH adjusted. Test samples are then stored at 25° C., 37° C. or 45° C. and assayed microbiologically for CTC activity periodically up to 21 days after treatment.

TABLE V

| | 25 mg. CTC fermentation product plus 10 g. molasses mix | | | | 25 mg. CTC fermentation product plus 20 g. molasses mix | | | |
|---|---|---|---|---|---|---|---|---|
| | "B", pH 6.6 | | "C", pH 8.5 | | "B", pH 6.6 | | "C", pH 8.5 | |
| Days stored, percent | 25° C. | 37° C. | 25° C. | 37° C. | 37° C. | 45° C. | 37° C. | 45° C. |
| 0 | 100 | | 100 | | 100 | | 100 | |
| 1 | 94 | 63 | 95 | 91 | | | | |
| 2 | | | | | | | | |
| 3 | 83 | 43 | 90 | 87 | 62 | 45 | 91 | 93 |
| 4 | | | | | | | | |
| 5 | 71 | 35 | 78 | 84 | 51 | 25 | 84 | 84 |
| 7 | 79 | 33 | 81 | 82 | 31 | 16 | 82 | 81 |
| 10 | | | | | | | | |
| 14 | 66 | 20 | 87 | 69 | 14 | 9 | 80 | 70 |
| 18 | 55 | | 80 | | | | | |
| 21 | 55 | 18 | 77 | 68 | 12 | 9 | 77 | 64 |

NOTE.—Percent given=percent recovery CTC.

EXAMPLE 4

Stabilization of chlortetracycline in protein molasses supplements employing magnesium chloride and pH adjustment, in place of calcium chloride and pH adjustment, is demonstrated in the following tests. In said tests 100 gms. of PMS mix were admixed with 8 gm. $MgCl_2·6H_2O$ and divided into two equal portions and said portions adjusted to pH 7 and 8 respectively. Each treatment was divided into 15 gm. samples and said admixed with 25 mg. of chlortetracycline fermentation product. The samples are then subjected to heat treatment in a boiling water bath for 30 minutes and then assayed for chlortetracycline activity. Data obtained are provided below.

EXAMPLE 6

The antibiotic stabilizing effect of different levels of a water soluble, ionizable salt which reacts with phosphorus to form an insoluble salt in situ is evidenced by the following tests.

15 gram portions of a commercial protein-molasses supplement comprising 50–66% molasses. 10.5–16.5% urea, 5–6% phosphoric acid, water, Vitamins A and $D_3$, trace minerals and an emulsifier, treated with from 1 to 8% by weight of calcium chloride and adjusted to pH 8.3–8.5 with 5 N NaOH, were placed in separate vials. 25 mg. of a chlortetracycline fermentation product (i.e. solids providing about 2188 to 2386 mcg. CTC/vial) was thoroughly mixed with the PMS in each vial and the vials stored at 45° C. or 56° C. At 2, 3 and 5 day intervals the contents of the vials were assayed microbiologically for chlortetracycline using the cylinder plate method commonly employed for antibiotic assays. Untreated PMS was used as a control. Data obtained are reported in Table VI below.

TABLE VI

| CTC/vial | Storage Temperature, °C. | Time | Activity, percent recovery |  |  |  |  |
|---|---|---|---|---|---|---|---|
| | | | Control pH 6.2, percent | Modified Mixture pH 8.3-8.5 after addition of CaCl₂ at— | | | |
| | | | | 1% | 2% | 4% | 8% |
| 2188 γ (100%) | 56 | 2 days (8/1/68) | 10 | 10 | 16 | 75 | 100 |
| 2192 γ (100%) | 45 | 3 days (8/2/68) | 11 | 15 | 26 | 82 | 102 |
| 2386 γ (100%) | 45 | 5 days (8/4/68) | 7 | 6 | 12 | 58 | 101 |

EXAMPLE 7

A molasses feed supplement containing 50% by weight protein equivalent (urea), 10% by weight salt (NaCl), 1% phosphorus (ammonium polyphosphate), vitamins, trace minerals and 70 mg./lb. of chlortetracycline as dried fermentation mash solids (55.0 gm. CTC/lb.) is used for the following determinations. 20 gram portions of the supplement are weighed into individual sample jars and untreated samples are used as controls. Test samples are prepared with either 2% or 8% by weight of calcium chloride and the pH thereof is adjusted to 7.0 or 8.5 with 1 N sodium hydroxide. All tests are run in duplicate and stability data reported as an average percent chlortetracycline recovery for both samples. Samples are assayed microbiologically to determine the amount of CTC present in the initially prepared samples and periodically after storage at room temperature or 37° C. Results are reported in Table VII below.

TABLE VII

| Storage period | Percent recovery CTC at— | | | | | | | |
|---|---|---|---|---|---|---|---|---|
| | Control | | 2% CaCl₂, pH 8.5 | | 8% CaCl₂, pH 7.0 | | 8% CaCl₂, pH 8.5 | |
| | RT | 37° C. | RT | 37° C. | RT | 37° C. | RT | 37° C. |
| 1 week | 32 | 9 | 69 | 34 | 111 | 93 | 108 | 110 |
| 2 weeks | | | | | 115 | 70 | 112 | 88 |
| 3 weeks | | | | | 114 | | 109 | |
| 4 weeks | | | | | 106 | | 108 | |

EXAMPLE 8

500 g. samples of a commercial protein molasses supplement containing 41% protein equivalent and 1.0% phosphorus (from ammonium polyphosphate), are treated with 0, 30 or 40 g. of calcium chloride (anhydrous). The mixtures are stirred and adjusted to pH 7.2 or 8.5. 70 mg. CTC/lb. of supplement is then admixed with the prepared samples. The chlortetracycline (CTC) is added as an aqueous slurry of spray dried mash (SDM) approximately 84% —324 mesh (U.S. screen size), a chlortetracycline formulation containing 55 g./lb. CTC (fermentation mash solids approximately 75%+325 mesh), polyoxyethylene sorbitan monooleate, alkalimetal lauryl sulfate, Dextrose and SiO₂, or a water soluble formulation of chlortetracycline bisulfate and sulfamethazine bisulfate (102.4 grams of each and q.s. to 1 lb. with lactose). Twenty gram portions of each prepared composition are then placed in separate vessels and stored at room temperature or 37° C. for up to 4 weeks following preparation. The samples are assayed microbiologically and the data are reported below.

TABLE VIII
Percent chlortetracycline recovery of initial assay value

| | Control untreated | | 8% CaCl₂ SDM, pH 8.5 | | 6% CaCl₂ SDM, pH 8.5 | | 6% CaCl₂ formulation, pH 7.2 | | 6% CaCl₂ formulation, pH 8.5 | | 6% CaCl₂ CTC soluble, pH 8.5 | |
|---|---|---|---|---|---|---|---|---|---|---|---|---|
| | RT | 37° C. | RT | 37° C. | RT | 37° C. | RT | 37° C. | RT | 37° C. | RT | 37° C. |
| 1 week | 52 | 8 | 91 | 69 | 96 | 72 | 96 | 77 | 90 | 90 | 93.5 | 54 |
| 2 weeks | 36 | | 85.5 | 49 | 82 | 50 | 79 | 54.5 | 94 | 74 | 72 | 31 |
| 3 weeks | | | 78 | | 77.5 | | 86 | | 96 | | 72.5 | |
| 4 weeks | | | 77 | | 74 | | 73 | | 80 | | 66 | |

From these data it can be seen that all CTC formulations prepared in accordance with the present invention exhibit vastly improved antibiotic stability. These data also show the benefit of high pH and larger particle size.

EXAMPLE 9

Following the procedure of Example 8 and employing the same liquid molasses supplement but substituting 0.6% or 1.22% magnesium (from MgCl₂.6H₂O) or 0.87% or 0.43% aluminum (from AlCl₃) for calcium chloride, it was established that improved chlortetracycline stability in liquid supplements could be obtained by the addition thereto of water soluble, ionizable aluminum and magnesium salts. Data obtained are reported below.

TABLE IX
Percent recovery chlortetracycline

| | 1.22% Mg, pH 7.0 | | 1.22% Mg, pH 8.5 | | 0.61% Mg, pH 7.0 | | 0.61% Mg, pH 8.5 | | 0.87% Al, pH 7.0 | | 0.87% Al, pH 8.5 | | 0.43% Al, pH 7.0 | | 0.43% Al, pH 8.5 | |
|---|---|---|---|---|---|---|---|---|---|---|---|---|---|---|---|---|
| | RT | 37° C. | RT | 37° C. | RT | 37° C. | RT | 37° C. | RT | 37° C. | RT | 37° C. | RT | 37° C. | RT | 37° C. |
| 1 week | 77 | 55 | 71 | 45 | 57.5 | | 71 | | 77.5 | | 101 | | 64 | | 78.5 | |
| 2 weeks | 67 | 39 | 62 | 42 | 74 | | 84 | | 89 | | 99 | | 76.5 | | 95 | |
| 3 weeks | 59 | | 53 | | | | | | | | | | | | | |
| 4 weeks | 55 | | 49 | | | | | | | | | | | | | |

EXAMPLE 10

Stabilization of liquid protein supplements against loss of tetracycline (TC) and oxytetracycline (OTC) potency is demonstrated in the following tests wherein TC and OTC, as fermentation mash solids, were substituted for chlortetracycline (CTC) in the procedure of Example 8.

TABLE X
Percent OTC and TC recovery

| | OTC | | TC | |
|---|---|---|---|---|
| | Control untreated, 37° C. | 6% CaCl₂ pH 8.5, 37° C. | Control untreated, 37° C. | 6% CaCl₂ pH 8.5, 37° C. |
| 1 week | 51.5 | 90 | 65 | 79 |
| 2 weeks | 28 | 86 | 50 | 69 |
| 3 weeks | 16 | 79.5 | 40 | 60 |

EXAMPLE 11

In the following tests liquid feed supplements are prepared from cane molasses, urea and phosphoric acid or ammonium polyphosphate, with and without water. Calcium hydroxide, or a mixture of calcium hydroxide with calcium chloride or calcium carbonate is added as the stabilizing agent and chlortetracycline is added as the spray dried mash, the formulation or the soluble powder of Example 8. Microbioassays for CTC are obtained by the AOAC method [1]. Data obtained are reported below and establish that various calcium salts improve antibiotic stability in liquid supplements and that high water content in such supplements reduces antibiotic stability.

The official AOAC procedures for the microbioassay of bacitracin in animal feeds [1] were adapted for use in the assay of PMS samples containing 5 to 10 units zinc bacitracin per gram.

Essentially, molasses mixtures are acidified to extract bacitracin activity which is then maintained in solution in a pyridine-phosphate buffer. All final assay solutions are prepared with 5% potassium phosphate buffer (pH 6.5) and tested by the agar-diffusion cylinder plate method using *Sarcina subflava* ATCC No. 7468.

For extraction of this series, a 10 gram portion of PMS was acidified with 4 ml. dilute HCl to obtain pH 0.9–1.0;

TABLE XI

| Formulae | | W./w. | W./w. | W./w. | W./w. | W./w. | W./w. |
|---|---|---|---|---|---|---|---|
| Ingredient No.: | | | | | | | |
| (1) | Molasses (86° Brix) | 65.0 | 65.0 | [1] 65.0 | 77.4 | 67.04 | 65.0 |
| (2) | Urea | 15.8 | 15.8 | 14.6 | 14.6 | 14.6 | 14.6 |
| (3) | $H_3PO_4$ 85.6% w./w. | 4.0 | 4.0 | 3.70 | 3.70 | 4.20 | [2] 4.20 |
| (4) | $Ca(OH)_2$ 4.34% (equiv. to 6.5% $CaCl_2$) | 4.34 | 4.34 | 3.60 | 4.00 | | |
| (5) | $CaCl_2$/6% | | | | | | |
| (6) | $CaCO_3$/0.5% | | | | | | |
| (7) | Water | 10.70 | 10.70 | 12.30 | | 14.00 | 11.74 |
| (8) | CTC-SDM | 0.16 | | 0.16 | | 0.16 | 0.16 |
| (9) | CTC-soluble | | 0.16 | | | | |
| (10) | CTC-formulation | | | | 0.16 | | |
| | pH | 8.3 | 8.3 | 8.35 | 8.15 | 3.6 | 8.4 |
| | | RT  37° C. | RT  37° C. | RT  37° C. | RT  37° C. | RT  37° C. | RT  37° C. |
| Percent CTC recovery: | | | | | | | |
| 1 week | | 94  76 | 98  82 | 91  64 | 92  90.7 | 75  35 | ----  87 |
| 2 weeks | | 81  64 | 86  60 | 73  54 | 92  81 | 65  16 | ---- ---- |
| 3 weeks | | 75  ---- | 79  ---- | 69  ---- | ----  90 | ---- ---- | ---- ---- |
| 4 weeks | | 73  ---- | 87  ---- | 67  ---- | 88  ---- | 55  ---- | ---- ---- |

[1] 79.5 Brix.   [2] 75% $H_3PO_4$.

EXAMPLE XII

| | Percent composition of PMS mixture using— | | | | | |
|---|---|---|---|---|---|---|
| | 6% $CaCl_2$ | 3% $CaCl_2$, 2% $Ca(OH)_2$ | NO $CaCl_2$, NO $Ca(OH)_2$ | 3% $CaCl_2$, 2% $Ca(OH)_2$ | 3.6 $CaCl_2$, 1.6 $Ca(OH)_2$ | 3.9 $CaCl_2$, 1.4 $Ca(OH)_2$ |
| Molasses (79.5° Brix) | 60 | 60 | 63.44 | 64.04 | 60.0 | 60.0 |
| Urea | 14.6 | 14.6 | 14.6 | 14.6 | 14.6 | 14.6 |
| Ammonium polyphosphate sol. (9-30-0; 9% $N_2$, 13% P) | 7.70 | 7.70 | 6.80 | 6.20 | 7.70 | 7.70 |
| $CaCl_2$ | 6.0 | 3.0 | | 3.00 | 3.6 | 3.9 |
| $Ca(OH)_2$ | | 2.0 | | 2.00 | 1.6 | 1.4 |
| Water | 10.0 | 10.0 | 15.0 | 10.0 | 10.0 | 10.0 |
| NaOH 51.2% w./w. | 4.0 | | | | | |
| CTC formulation | 0.16 | 0.16 | 0.16 | 0.16 | 0.16 | 0.16 |
| pH | 8.5 | 8.25 | 5.6 | 8.5 | 7.9 | 7.4 |
| Percent CTC recovery: | RT  37° C. | RT  37° C. | RT  37° C. | RT  37° C. | RT  37° C. | RT  37° C. |
| 1 week | 96  69 | 86  71 | 53  10 | ----  72 | 86  55 | 88.5  50 |
| 2 weeks | 87  56 | 80  55 | 38  7.75 | 101  62 | 78  41.5 | 73  36 |
| 3 weeks | 83  ---- | 74  ---- | ---- ---- | 67  ---- | 67  ---- | 67.5  ---- |
| 4 weeks | 80  ---- | 76  ---- | 23  ---- | 90  ---- | 63  ---- | 67.5  ---- |

EXAMPLE 12

The stabilization of protein molasses supplements containing zinc bacitracin or a mixture of the chlortetracycline and sulfamethazine is demonstrated by the following tests wherein 107 mg. of zinc bacitracin, assaying 56 units/mg., is dissolved in distilled water to provide 100 ml. of solution containing 60 units of zinc bacitracin. One ml. of the thus prepared solution is added to separate vials containing 10 grams of a commercial protein molasses supplement. The untreated control has a pH of 6.3. A second control is prepared by simply adjusting the pH of the thus prepared supplement to a value between about 8.0 and 8.3 and the composition of the invention is prepared by treating a similar sample with 4% by weight of calcium chloride and adjusting the pH of said sample to between about 8.0 and 8.3. The samples are then assayed microbiologically and selected samples from each preparation are immersed in boiling water for 10 or 30 minutes, then stored at room temperature for two weeks. After such treatment said samples are again assay microbiologically using modified AOAC procedures for bacitracin to determine the percent recovery of the drug and the data are provided in the table below.

mixed in 18 ml. pyridine-phosphate buffer (pyridine 25% in pH 6.0 phosphate buffer); and made up to 100 ml. volume with 5% phosphate buffer; further dilutions in 5% buffer to obtain approximately 0.1 unit bacitracin per milliliter for the assay solution.

TABLE XIII

| | Percent drug recovery | | | |
|---|---|---|---|---|
| PMS treatment | Initial | Boiling | | Room temp., 2 wks. |
| | | 10 min. | 30 min. | |
| Untreated control pH 6.3 | 100 | 60 | 28 | 58 |
| Control pH 8.3 | 100 | 54 | 20 | 29 |
| 4.0% $CaCl_2$ plus pH 8.3 | 100 | 68 | 37 | 59 |

EXAMPLE 13

In the following tests, eight beef steers were allotted to separate pens. The cattle had access to feed at all times, somewhat more feed was offered (20–25 lbs.) than could be consumed in a 24-hour period. Feed weighback was recorded daily. The protein liquid supplement was poured on the pellets and fed at the rate of 1 lb./head/day. Water was supplied to each pen by automatic waterers.

---

[1] Official Methods of the AOAC, Association of Official Analytical Chemists, Washington, D.C., 10th edition (1965).

[1] Official Methods of Analysis of the AOAC; Assoc. Official Analytical Chemists, Washington, D.C., 10th edition -965), pp. 655–656.

Composition of Basal Ration [1]

| Ingredients: | Percent |
| --- | --- |
| Ground corn cobs | 43.8 |
| Cracked corn | 40.0 |
| Soybean meal | 6.0 |
| Cane molasses | 6.0 |
| Dehydrated alfalfa | 3.0 |
| Dicalcium phosphate | 1.2 |
| | 100.0 |

[1] In pelleted form.

COMPOSITION OF LIQUID SUPPLEMENT AMMONIUM POLYPHOSPHATE

| | Control, percent | Stabilized percent |
| --- | --- | --- |
| Molasses | 63.44 | 64.04 |
| Urea | 14.60 | 14.60 |
| Ammonium polyphosphate solution | 6.80 | 6.20 |
| Tap water | 15.00 | 10.00 |
| Chlortetracycline fermentation solids formulation 55 g. CTC/lbs | 0.16 | 0.16 |
| $CaCl_2$ | | 3.00 |
| $Ca(OH)_2$ | | 2.00 |
| pH | 5.6 | 8.5 |

TABLE XIV.—FEED CONSUMPTION, LBS.

| Days | Animal numbers— | | | | | | | |
| --- | --- | --- | --- | --- | --- | --- | --- | --- |
| | 1 | 2 | 3 | 4 | 5 | 6 | 7 | 8 |
| 1 | 13 | 11.5 | 13.5 | 10 | 7 | 6 | 5.5 | 8 |
| 2 | 14 | 16.5 | 14.5 | 6.0 | 17 | 8 | 12.5 | 9 |
| 3 | 19 | 8 | 18 | 16.5 | 20 | 6.5 | 15.5 | 13 |
| 4 | 20 | 18 | 17 | 18 | 20 | 8 | 18 | 15 |
| 5 | 15.5 | 17 | 15 | 12.5 | 17 | 8.5 | 14.5 | 15 |
| 6 | 13.5 | 18 | 19 | 15.5 | 19.5 | 8.5 | 15.5 | 15 |
| 7 | 23.5 | 24 | 19 | 21.5 | 23.5 | 13 | 21.5 | 23 |
| Average | 16.9 | 16.1 | 16.6 | 14.3 | 17.7 | 8.4 | 14.7 | 14.0 |
| 8 | 18 | 24.5 | 23 | 20.5 | 21 | 15 | 17 | 20 |
| 9 | 23.5 | 24.5 | 18 | 21.5 | 19 | 10 | 14 | 16 |
| 10 | 23 | 24.5 | 19 | 23 | 23.5 | 12.5 | 7.5 | 17 |
| 11 | 23 | 22 | 17 | 23 | 21 | 15 | 20 | 19 |
| 12 | 22 | 23.5 | 14 | 17 | 23.5 | 18 | 17 | 23.5 |
| Average | 21.9 | 23.8 | 18.2 | 21.0 | 21.6 | 14.1 | 15.1 | 19.1 |

All cattle were fed liquid protein supplement (pH unadjusted) for 7 days. Animals 1–4 fed the above liquid protein supplement for 5 days, whereas animals 5–8 were fed liquid protein supplement with calcium added and adjusted to pH 8.5. The acceptability of the liquid supplement of the present invention is well established by the above data.

EXAMPLE 14

The stability of a mixture of chlortetracycline and sulfamethazine is dispersed in a protein molasses supplement and assayed to determine the stability of each of said drugs in said supplement. In these tests 100 mg. of a dry product assaying 77 mcg. of each drug per mg. of product is admixed with 10 gm. samples of said supplement in individual tubes. The products thus prepared are assayed microbiologically for chlortetracyline and chemically for sulfamethazine and then subjected to one of the following treatments: (1) submersion in boiling water for 10 minutes. (2) submersion in boiling water for 30 minutes or (3) storage at room temperature for two weeks. Following such treatment the prepared samples are again assayed and the results obtained are recorded and reported above.

EXAMPLE 15

In the following tests, wood molasses or hemicellulose extract is mixed with chlortetracycline fermentation mash solids. Test samples are prepared using 100 gm. portions of the mixture with addition of various ingredients alone, or in combination as outlined in the treatment-tabulation below. Materials employed are as follows:

(A) Hemicellulose extract

| Guaranteed Analysis: | Percent |
| --- | --- |
| Crude protein (min) | 0.50 |
| Crude fat (min) | 0.50 |
| Crude fiber (max) | 0.50 |
| Ash (max) | 6.00 |
| Carbohydrates | 55.00 |

(B) Phosphoric acid—85% reagent grade
(C) Calcium chloride—anhydrous
(D) Urea prills
(E) Biuret technical grade The Beckman, Model G pH meter, equipped with separate glass and calomel electrodes, was employed for all pH adjustments.

In all instances, the chlortetracycline was individually weighed (25 mg.) for each assay tube (25 mm. x 150 mm.) and about 15 grams of the hemicellulose extract mixture was added to the tube (approximating 60 mg. CTC/lb. mixture). The test tubes were covered with aluminum foil and placed in plastic bags; stability test samples were held in constant temperature ovens (45° C. or 56° C.) and removed at specified time intervals i.e. after two days at 56° C. and after three and five days at 45° C.

All "initial" or zero-day tubes and heat-treated tubes were held frozen, if necessary, until assayed.

Samples were tested for activity by A.O.A.C. cylinder plate procedures,[1] using *Bacillus cereus* ATCC 11778; percentage recovery of activity was based on assay of initial or zero-day samplings.

[1] Official Methods of Analysis, 10th edition (1965), Association of Official Analytical Chemists, Washington, D.C.

TABLE XV

| Drug | PMS treatment | | Percent drug recovery | | | |
| --- | --- | --- | --- | --- | --- | --- |
| | | | Initial | Boiling | | Room temp., 2 wks. |
| | | | | 10 min. | 30 min. | |
| Chlortetracycline plus Sulfamethazine 77 mcg. each/mg. dry product. | Untreated control, pH 6.3 | CTC | 104 | 80 | 40 | 52 |
| | | S | 96 | 97 | 96 | 98 |
| | Control pH 8.3 | CTC | 99 | 59 | 32 | 47 |
| | | S | 101 | 98 | 98 | 97 |
| | 4% $CaCl_2$ plus pH 8.3 | CTC | 96 | 98 | 78 | 78 |
| | | S | 104 | 101 | 93 | 101 |

NOTE.—S=Sulfamethazine; CTC=Chlortetracycline.

For test purposes plain hemicellulose extract was mixed with urea and biuret, or biuret alone as follows:

| | Biuret alone | | Urea plus biuret | |
| --- | --- | --- | --- | --- |
| Ingredient | Wt. used g. | Percent total wt. | Wt. used, g. | Percent total wt. |
| Hemicellulose extract | 800 | 93.75 | 525 | 51.72 |
| Urea | | | 350 | 34.39 |
| Biuret | 53.3 | 6.25 | 140 | 13.79 |

TABLE XVI.—PREPARATION OF WOOD MOLASSES MIXTURES FOR CHLORETETRACYCLINE STABILITY TESTS

| Treatment per 100 gm. product | Tested at— | Masonex*—Plain: "65% solids," at pH-4.6 as received; adjusted 850 grams with 11 ml. of 50% NaOH to obtain pH 5.5 | Masonex* plus urea plus biuret: Masonex-800 gms. plus biuret-53.3 gm. This product at pH 5.0; adjusted batch with 9 ml. of 50% NaOH to obtain pH 5.5 | Masonex* plus urea plus biuret: Masonex-525 gm. plus urea-350 gm. plus biuret 5.5.: (this product at pH 6.0) | Masonex*—43% urea: Sample #2, production mixture, 57% Masonex (65% solids) 43% urea; at pH 5.5 as received |
|---|---|---|---|---|---|
| I.... No additions adjust to | pH 5.5 / pH 7.5 | | See above. | Added 3 ml. N/I. HCl to obtain pH 5.5. Mixture at pH 5.0; used 5 ml. 5N NaOH to obtain pH 7.5. | See above. Mixture at pH 4.5; used 4.9 ml. of 5N NaOH to obtain pH 7.5. |
| II.... 8% calcium chloride (8 g. CaCl₂ anhydrous plus 8 ml. H₂O, warmed to dissolve). | pH 5.5 | See batch adjustment above. Mixture at pH 4.6; used 6 ml. of 5N NaOH to obtain pH 7.5. | See batch adjustment above. Mixture at pH 4.6; used 6.5 ml. 5N NaOH to obtain pH 7.5. | | |
| III.... 1% phosphorous (from H₃PO₄) used 2.2 ml. of 85% phosphoric acid reagent grade. | pH 5.5 | Mix at pH 4.0; added 9.5 ml. of 5N NaOH to obtain pH 5.5. | Mixture at pH 3.9; added 9 ml. of 5N NaOH to obtain pH 5.5. | Mixture at pH 4.15; added 5.5 ml. 5N NaOH to obtain pH 5.5. | Not tested. |
| IV.... 1% phosphorus (from H₃PO₄) then add 8% calcium chloride. | pH 5.5 | With H₃PO₄=pH 4.0; adding CaCl₂=pH 3.3; added 7 ml. of 50% NaOH to obtain pH 5.5. | With H₃PO₄=pH 3.9; adding CaCl₂=pH 3.1; added 7 ml. of 50% NaOH to approx. pH 5.0, then added 3 ml. 5N NaOH to obtain pH 5.5. | With H₃PO₄=pH 4.15; addition of CaCl₂=pH 3.3; added 7 ml. of 50% NaOH (about pH 5.4) then 1 ml. 5N NaOH to obtain pH 5.5. | Not tested. |
| V..... 1% phosphorus (from H₃PO₄) used 2.2 ml. of 85% phosphoric acid. | pH 7.5 | Mixture at pH 4.0; added 8 ml. of 50% NaOH and 1.5 ml. of 5N NaOH to obtain pH 7.5. | Mixture at pH 3.9; added 8 ml. 50% NaOH (approx. pH 7.1) and 2 ml. 5N NaOH to obtain pH 7.5. | Mixture at pH 4.15; adding CaCl₂=pH 3.3; added 10 ml. of 50% NaOH (about pH 7.2) then added one ml. 5N NaOH to obtain pH 7.5. | Mixture at pH 3.7; added 3 ml. of 5N NaOH and 8 ml. of 5N NaOH to obtain pH 7.5. |
| VI.... 1% phosphorus (from H₃PO₄) then add 8% calcium chloride. | pH 7.5 | With H₃PO₄=pH 4.0, adding CaCl₂=pH 3.3; used 10 ml. of 50% NaOH to obtain pH 7.5. | With H₃PO₄=pH 3.9; adding CaCl₂=pH 3.1; added 12 ml. 50% NaOH to obtain pH 7.5. | | With H₃PO₄=pH 2.8; adding 9 ml. of 50% NaOH and one ml. of 5N NaOH to obtain pH 7.5. |

*Masonex=Wood molasses or hemicellulose extract.

TABLE XVII

Chlortetracycline (CTC) microbiological assay Masonex* mixtures stored at 45° C. and 56° C.; antibiotic, percent recovery

| Product tested | Storage conditions, temp./time | I No additions, pH 5.5 | II 8 percent CaCl₂ adjusted pH 7.5 | III 1 percent phosphorus (from H₃PO₄) adj. to pH 5.5 | IV 1 percent phosphorus (from H₃PO₄) then 8 percent CaCl₂, adj. to pH 5.5 | V 1 percent phosphorus (from H₃PO₄) adj. to pH 7.5 | VI 1 percent phosphorus (H₃PO₄) 8 percent CaCl₂ adj. to pH 7.5 |
|---|---|---|---|---|---|---|---|
| Masonex*—Plain | Freezer—Initial a | 100% a | 100% a | 100% a | 100% a | 100% a | 100% a |
| | 56° C., 2 days | 59% | 73% | 46% | 50% | 50% | 66% |
| | 45° C., 3 days | 59% | 86% | 51% | 42% | 63% | 97% |
| | 45° C., 5 days | 47% | 69% | 53% | 47% | 36% | 71% |
| a Initial assay, mcg CTC/tube → | | 2,020 | 1,890 | 1,920 | 2,070 | 1,670 | 1,830 |
| Masonex* plus biuret | Freezer—Initial b | 100% b | 100% b | 100% b | 100% b | 100% b | 100% b |
| | 56° C., 2 days | 47% | 83% | 47% | 42% | 45% | 68% |
| | 45° C., 3 days | 63% | 81% | 47% | 58% | 28% | 73% |
| | 45° C., 5 days | 51% | 84% | 27% | 41% | 15% | 65% |
| b Initial assay, mcg CTC/tube → | | 1,870 | 1,550 | 1,600 | 2,160 | 2,100 | 2,260 |
| Masonex* plus urea plus biuret | Freezer—Initial c | 100% c | 100% c | 100% c | 100% c | 100% c | 100% c |
| | 56° C., 2 days | 39% | 83% | 12% | 35% | <10% | 81% |
| | 45° C., 3 days | 55% | 88% | 33% | 49% | 11% | 89% |
| | 45° C., 5 days | 48% | 88% | 15% | 32% | <10% | 82% |
| c Initial assay, mcg CTC/tube → | | 2,080 | 1,800 | 1,900 | 1,880 | 1,600 | 1,950 |
| Masonex* plus urea | Freezer—Initial d | 100% d | 100% d | 100% d | 100% d | 100% d | 100% d |
| | 56° C., 2 days | 33% | 58% | | | <5% | 89% |
| | 45° C., 3 days | 50% | 71% | | | <5% | 91% |
| | 45° C., 5 days | 42% | 62% | | | <5% | 84% |
| d Initial assay, mcg CTC/tube → | | 2,140 | 2,140 | | | 2,050 | 2,090 |

*Masonex=Wood molasses or hemicellulose extract.

I claim:

1. A stable, liquid protein supplement containing a nonprotein nitrogen source selected from the group consisting of urea, ammonia, ammonium polyphosphate, diammonium phosphate, biuret and mixtures thereof; a phosphorus compound selected from the group consisting of phosphoric acid, diammonium phosphate, ammonium polyphosphate, monosodium phosphate and mixtures thereof; a tetracycline antibiotic; and stabilized against antibiotic loss by the presence therein of from about 1% to 8% by weight of a physiologically acceptable salt of a divalent or trivalent metal which forms an insoluble or non-ionizable salt or complex with the phosphate in said supplement, said metal being selected from the group consisting of calcium, magnesium, iron, copper, cobalt, zinc, manganese and aluminum and said supplement having a pH value between about 7.0 and 9.0.

2. A stable, liquid protein supplement in accordance with claim 1 comprising: molasses; from about 3 to 43% by weight of a nonprotein nitrogen source; a phosphorus compound in an amount sufficient to provide from about 0.05% to 3.5% by weight of phosphorus; from about 0.01% to 7% by weight of a tetracycline antibiotic; and stabilized against antibiotic loss by the presence therein of from about 1% to 8% by weight of a physiologically acceptable salt of a metal selected from the group consisting of calcium, magnesium, aluminum, iron, cobalt, copper, zinc and manganese and said supplement having a pH between about 7.0 and 9.0.

3. A composition according to claim 2 wherein the nonprotein nitrogen source is about 5% to 20% by weight of said supplement; the phosphorus content is about 0.75% to 2.0% by weight of said supplement; the tetracycline antibiotic is selected from the group consisting of tetracycline, oxytetracycline, chlortetracycline, and demethylchlortetracycline; and the metal salt is a calcium salt and the pH of said supplement is between about pH 8.0 and 9.0.

4. A composition according to claim 3 wherein the antibiotic is chlortetracycline and the metal salt is a calcium salt selected from the group consisting of calcium chloride, calcium hydroxide, calcium carbonate and mixtures thereof.

5. A method for the preparation of a stable, liquid antibiotic protein supplement according to claim 1 comprising: admixing molasses with about 3 to 43% by weight of a nonprotein nitrogen source selected from the group consisting of urea, biuret, ammonia, ammonium polyphosphate, diammonium phosphate and mixtures thereof; a phosphorus compound in an amount sufficient to provide from about 0.05% to 3.5% by weight of phosphorus; from about 0.01% to 7.0% by weight of a tetracycline antibiotic selected from the group consisting of tetracycline, oxytetracycline, chlortetracycline, and demethylchlortetracycline; and from about 1% to 8% by weight of a physiologically acceptable divalent or trivalent metal salt selected from the group consisting of salts of calcium, magnesium, iron, copper, cobalt, zinc, manganese and aluminum and adjusting the pH of said supplement to a value between about 7.0 and 9.0.

6. A method according to claim 5 wherein the nonprotein nitrogen source is provided by a compound selected from the group consisting of urea, biuret, ammonia, ammonium polyphosphate, diammonium phosphate and mixtures thereof; the phosphorus amounts to about 0.75 to 2% by weight of said supplement and is provided by a compound selected from the group consisting of phosphoric acid, diammonium phosphate, ammonium polyphosphate and monosodium phosphate and mixtures thereof; the antibiotic is chlortetracycline; and the metal salt is a calcium salt selected from the group consisting of calcium chloride, calcium hydroxide, calcium carbonate and mixtures thereof.

References Cited

UNITED STATES PATENTS

| | | | |
|---|---|---|---|
| 2,962,378 | 11/1970 | Huhtanen et al. | 424—227 |
| 3,022,218 | 2/1962 | Sherman | 424—227 |
| 3,166,474 | 1/1965 | Sieger et al. | 424—227 |
| 3,275,513 | 9/1966 | Nash et al. | 424—227 |
| 3,427,166 | 2/1969 | Abbey et al. | 424—227 |

SAM ROSEN, Primary Examiner

U.S. Cl. X.R.

424—177